(12) United States Patent
Iino et al.

(10) Patent No.: US 6,400,063 B2
(45) Date of Patent: Jun. 4, 2002

(54) ULTRASONIC MOTOR AND ELECTRONIC APPARATUS HAVING AN ULTRASONIC MOTOR

(75) Inventors: Akihiro Iino; Masao Kasuga, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/878,867

(22) Filed: Jun. 11, 2001

(30) Foreign Application Priority Data

Jun. 13, 2000  (JP) ........................................ 2000-176461

(51) Int. Cl.[7] .............................................. H01L 41/08
(52) U.S. Cl. .................................................. 310/316.02
(58) Field of Search ....................... 310/316.01, 316.02, 310/323.02, 325; 318/116

(56) References Cited

U.S. PATENT DOCUMENTS

| | | | | |
|---|---|---|---|---|
| 5,521,455 A | * | 5/1996 | Miyazawa et al. ..... | 310/323.02 |
| 5,734,236 A | * | 3/1998 | Motegi ....................... | 318/114 |
| 5,765,046 A | * | 6/1998 | Watanabe et al. ............. | 396/53 |
| 6,064,138 A | * | 5/2000 | Iino et al. .............. | 310/316.01 |
| 6,144,140 A | * | 11/2000 | Iino et al. .............. | 310/316.02 |

* cited by examiner

Primary Examiner—Mark Budd
(74) Attorney, Agent, or Firm—Adams & Wilks

(57) ABSTRACT

A long-life ultrasonic motor is provided which increases the output and efficiency and reduces the wear on a moving body. By mounting such an ultrasonic motor on an electronic apparatus, the electronic apparatus is improved in performances including the size-reduction, thickness-reduction, power saving, etc. By configuring a stable self-excited oscillation circuit between first and third electrodes of a piezoelectric element and applying a drive signal to a second electrode through a phase selection circuit for changing the phase of a self-excited oscillation signal, two signals different in phase are supplied to the ultrasonic motor while using the self-excited oscillation circuit.

12 Claims, 9 Drawing Sheets

ULTRASONIC MOTOR AND ELECTRONIC APPARATUS HAVING AN ULTRASONIC MOTOR

BACKGROUND OF THE INVENTION

1. Technical Field of the Invention

This invention relates to an ultrasonic motor to be driven by a self-excited oscillation circuit and, more particularly, to an ultrasonic motor to be driven on two signals different in phase and to an electronic apparatus using the same.

2. Description of the Related Art

Recently, the ultrasonic motors using piezoelectric elements have been actively developed. Various kinds of ultrasonic motors have already been placed in the market. Generally, the driving schemes of the ultrasonic motors, in many cases, use a scheme two phase-different signals are supplied to the piezoelectric element thereby causing traveling waves onto the vibrating body, and a scheme of utilizing two standing waves to turn the displacement at a vibrating-body end surface into elliptic motion.

However, these driving schemes are of the so-called separately-excited oscillation scheme requiring an external oscillation circuit for obtaining a particular frequency. Thus complicates the driving circuits and increases the size thereof.

In such a circumstance, there is a recent devise and reduction into practice of a scheme utilizing an ultrasonic motor having a piezoelectric element as a vibrator to combine this with an amplifier circuit, thereby constituting a self-excited oscillation circuit for causing drive due to the oscillation of the ultrasonic motor itself. Such a scheme of an ultrasonic motor is disclosed, for example, in Japanese Patent Laid-open No. 251952/1996.

However, the ultrasonic motor as shown in Japanese Patent Laid-open No. 251952/1996 uses only one of a standing wave. This makes vibrating-body displacement almost in linear motion, thereby leading to reduced conversion efficiency, increased wear amount on the moving body and shortened life. Furthermore, the part of the piezoelectric element used for drive is small in ratio relative to the entire piezoelectric element, making impossible to obtain high output.

SUMMARY OF THE INVENTION

Therefore, the present invention has been made in order to solve the above problem and it is an object of the present invention to increase the output and efficiency of an ultrasonic motor, reducing the wear on the moving body and increase the life of the ultrasonic motor.

It is another object to mount such an ultrasonic motor on an electronic apparatus thereby improving the performances of an electronic apparatus including the size and thickness reduction, power saving, etc.

An ultrasonic motor according to the present invention is an ultrasonic-motor having a moving body to be driven by vibration of a vibrating body having a piezoelectric element, comprising: the piezoelectric element having first, second and third electrodes; an output signal from the third electrode being amplified by an amplifier circuit and fed back to the first electrode thereby constituting a self-excited oscillation circuit; phase selection means provided to select whether to invert or not invert a signal based on an oscillation signal of the self-excited oscillation circuit according to an external instruction signal; and an output signal of the phase selection means being applied to the second electrode to obtain a drive force.

Furthermore, an ultrasonic motor according to the invention is an ultrasonic motor having a moving body to be driven by vibration of a vibrating body having a piezoelectric element, comprising: the piezoelectric element having first, second and third electrodes; an amplifier circuit for amplifying an output signal from the third electrode; first signal switching means provided to select whether to output an output signal of the amplifier circuit to the first electrode or to the second electrode, according to an external instruction signal; and a self-excited oscillation circuit formed by the third electrode, the amplifier circuit and an electrode selected by the first signal switching means; and second signal switching means provided to select whether to output a signal based on an oscillation signal of the self-excited oscillation circuit to the first electrode or to the second electrode, according to an external instruction signal.

The foregoing ultrasonic motor is configured to obtain positive self-excited oscillation between the two electrodes of the piezoelectric element, i.e. electrically in a single phase. The oscillation signal obtained here in is passed through a buffer circuit and then delivered to the second electrode through a phase-shift circuit, thereby making it possible to supply two signals different in phase to the ultrasonic motor without having an effect upon oscillation stability of self-excited oscillation.

Furthermore, the provision of either phase selection means for selecting a presence or absence of phase inversion of a signal obtained from the phase-shift circuit or signal switching means for switching between an electrode to generate a self-excited oscillation signal and an electrode to be supplied by a signal different in phase, thereby easily realizing the switching in moving direction of the moving body.

DETAILED DESCRIPTION OF PREFERRED EMBODIMENTS

The present invention will now be explained in detail with reference to the drawings. It should be noted that the embodiments is not be construed to limit the invention.

Embodiment 1

Figure 1:
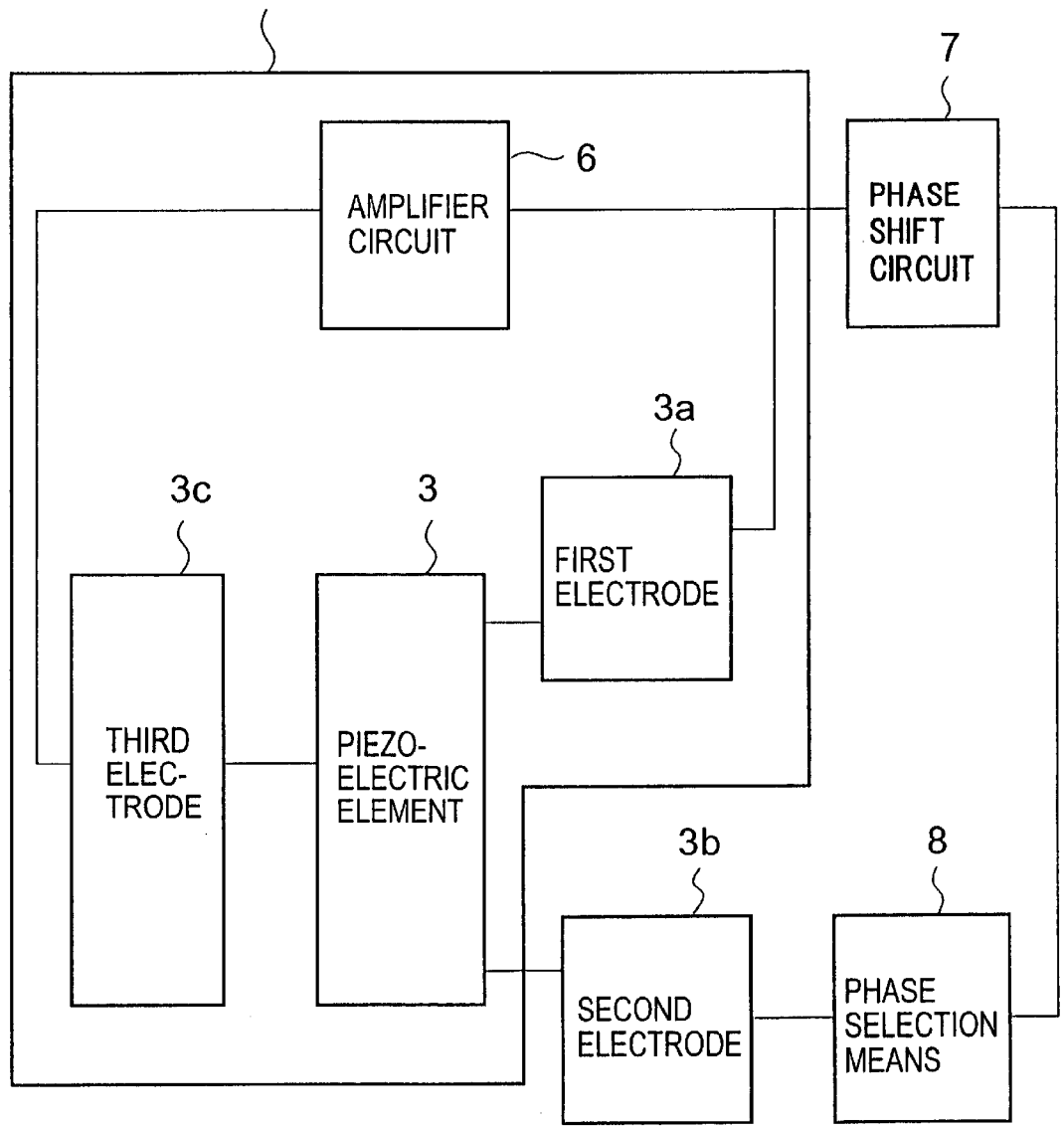
FIG. 1 is a block diagram of an ultrasonic motor according to Embodiment 1 of the present invention.
Figure 2:
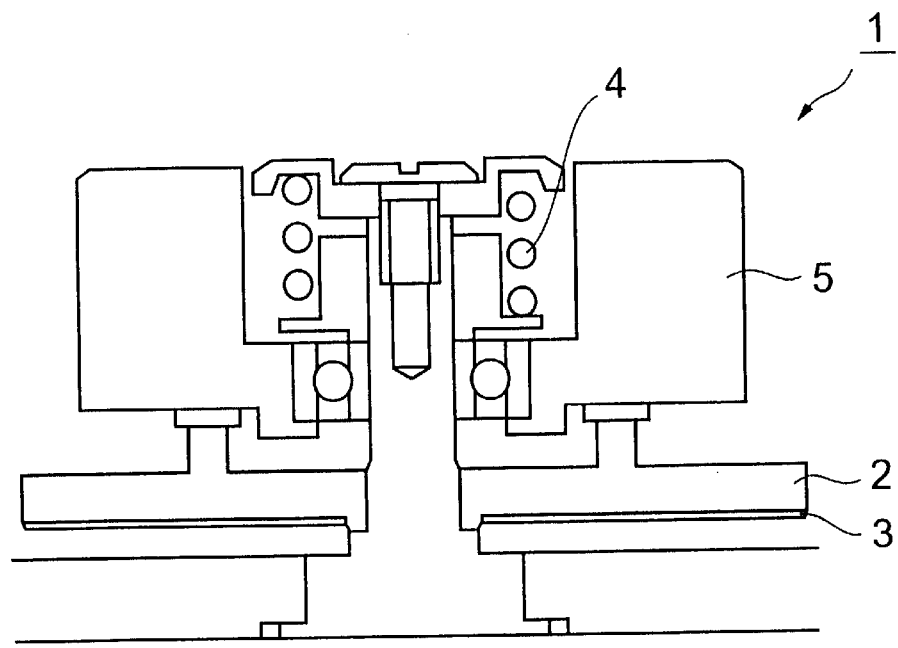
FIG. 2 is a structural view of an ultrasonic motor applicable to the invention.

FIG. 1 is a block diagram showing a configuration of an ultrasonic motor and ultrasonic motor drive circuit according to Embodiment 1 of the invention. FIG. 2 represents a structure of an ultrasonic motor to be applied to the invention. FIG. 3 is an electrode pattern figure of piezoelectric elements of the ultrasonic motor to be applied to the invention.

Figure 3A:
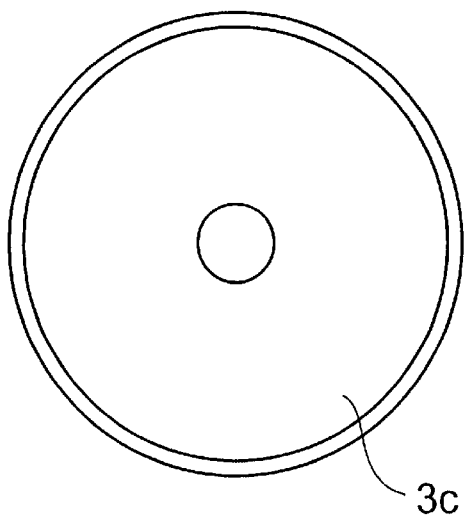
FIG. 3 is a figure of an electrode pattern of the ultrasonic motor applicable to the invention.
Figure 3B:
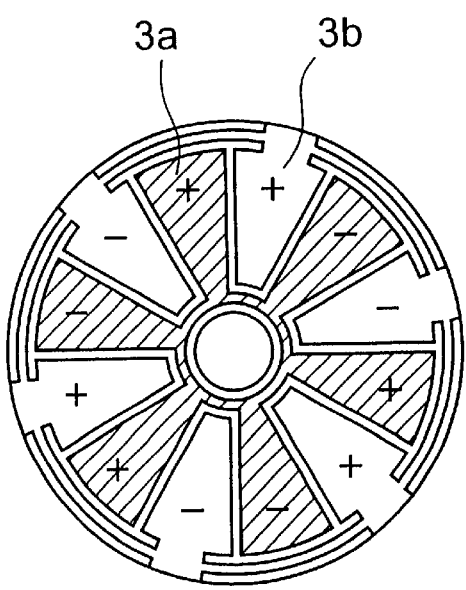

First, the principle of an ultrasonic motor 1 will be explained with reference to FIG. 2 and FIG. 3. In FIG. 2, a piezoelectric element 3 is bonded on a lower surface of a disc-formed vibrating body 2. A third electrode 3c is provided over nearly the entire of one surface of the piezoelectric element 3, i.e. on a side bonded to the vibrating body 2, as shown in FIG. 3A. Small electrodes, circumferentially divided at an interval of a quarter wavelength, are circumferentially provided on the other surface of the piezoelectric element 3, as shown in FIG. 3B. The small electrodes are divided as two electrodes of hatched part 3a and non-hatched part 3b by providing polarization to each of the adjacent two (in the figure, + and − denote polarization directions) while changing the polarization direction and then circumferentially giving electrical conductivity to every other one of them. In FIG. 3B, short-circuit patterns are further provided in inner and outer peripheries to short-circuit every other one of the small electrodes.

When different-phased signals are respectively applied to between the first electrode 3a and the third electrode 3c and between the second electrode 3b and the third electrode 3c, two standing waves having different phases in position and time are caused on the piezoelectric element 3 there by generating a traveling wave as a combination of them. This causes rotation of the moving body 5 in contact with protrusions 2a provided on the vibrating body 2. The contact pressure between the vibrating body 2 and the moving body 5 is obtained by a pressurizing mechanism 4. The rotational direction of the moving body 5 can be changed by phase inversion of the two signals.

Although the structure and drive principle of the ultrasonic motor 1 applicable to the invention was shown above, the structure is not limited to the example shown herein but may be in any form if the ultrasonic motor is driven by the application of two signals different in phase.

Next, the operation of Embodiment 1 of the invention will be explained using FIG. 1.

The output signal from the third electrode 3c provided on the piezoelectric element 3 is amplified in an amplifier circuit 6 and fed back to the first electrode 3a, thereby constituting a self-excited oscillation circuit 10 oscillating at an eigenfrequency of the piezoelectric element 3. Although the vibrating body 2 is not described herein, it is satisfactory that the piezoelectric member 3 only serves also as the vibrating body 2 to give driving force to the moving body 5. Otherwise, the vibrating body 2 may be bonded on the piezoelectric element 3 as in FIG. 2.

The oscillation signal of the self-excited oscillation circuit 10 is shifted in phase (e.g. 90 degrees) in a phase-shift circuit 7. This signal is passed through the phase selection means 8 and then applied to the second electrode 3b. Consequently, two signals different in phase are applied to the piezoelectric element 3. Because of generation of two standing waves having different phases in time, the displacement is given as elliptical motion.

In the meanwhile, the phase selection means 8 further adjusts the phase of the output signal of the phase-shift circuit 7 according to an instruction signal from the external. This changes the displacement direction of the elliptical motion, thereby changing the moving direction of the moving body 5.

Next, a detailed circuit configuration will be explained using FIG. 4.

The output signal from the third electrode 3c provided on the piezoelectric element 3 is amplified in the amplifier circuit 6 configured by a three-state inverter 6a and a feedback resistance 6b and then fed back to the first electrode 3a through a buffer 11.

On this occasion, a signal having a frequency component at around the eigenfrequency of the vibrating body 2 including the piezoelectric element 3 is fed back to the amplifier circuit 6 by a feedback circuit comprising the piezoelectric element 3, a resistance 19, capacitors 12, 13 and a buffer 11. By maintaining the oscillation, a self-excited oscillation circuit 10 is constituted. Part of a self-excited oscillation signal is taken out through the buffer 9 and shifted in phase by a predetermined amount in the phase-shift circuit 7. Although herein is shown an example that the phase-shift circuit 7 is configured by a low-pass filter circuit formed by the resistance 7a and the capacitor 7b, these may be arranged in a plurality of stages to increase the phase-shift amount. Otherwise, another scheme of a circuit may be used to constitute a phase-shift circuit 7 without limited to this embodiment.

Thereafter, the output signal from the phase-shift circuit 7 is passed through the phase-shift selection circuit 8 capable of selecting a phase-shift amount and then outputted to the second electrode 3b, according to an external instruction signal. Herein, the self-excited oscillation signal is taken out through the buffer 9 high in input impedance but low in output impedance. Accordingly, stable oscillation is feasible without having an effect upon the self-excited oscillation circuit. In this example, the phase selection circuit 8 makes any of the three-state inverter 8a and the three-state buffer 8b in an enabled state, according to an external instruction signal. This determines whether to output as it is the output signal from the phase-shift circuit 7 without phase shift or to invert it by 180 degrees. For example, if the phase-shift amount in the phase-shift circuit 7 is given 90 degrees, the second electrode 3b is supplied with a signal advanced in phase by 90 degrees with respect to the electric signal supplied to the first electrode 3a or a signal delayed by 90 degrees, according to an external instruction signal. Thus, the vibration caused on the vibrating body 2 is changed in direction of the elliptic motion, thereby changing a moving direction of the moving body 5.

In the meanwhile, the phase-shift circuit 7 in some cases may be omitted. This is because, where utilizing for example an ultrasonic motor as described in Japanese Patent Laid-open No. 32491/1999, e.g. combined vibration of expansion and bending vibrations on a rectangular plate, the moving direction of the moving body 5 can be changed by making these two vibrations in the same phase or in opposite phase.

Herein, in the forward of the first electrode 3a and second electrode 3b, a buffer 11, a three-state inverter 8a and a three-state buffer 8b are particularly provided equivalent in electric characteristics (amplification degree, internal impedance, delay time, etc.). Accordingly, the two standing waves generated on the vibration body 2 are made in the equivalent amplitude. Further, the ultrasonic motor 1 is given a characteristic constant regardless of a moving direction of the moving body 5.

Figure 4:
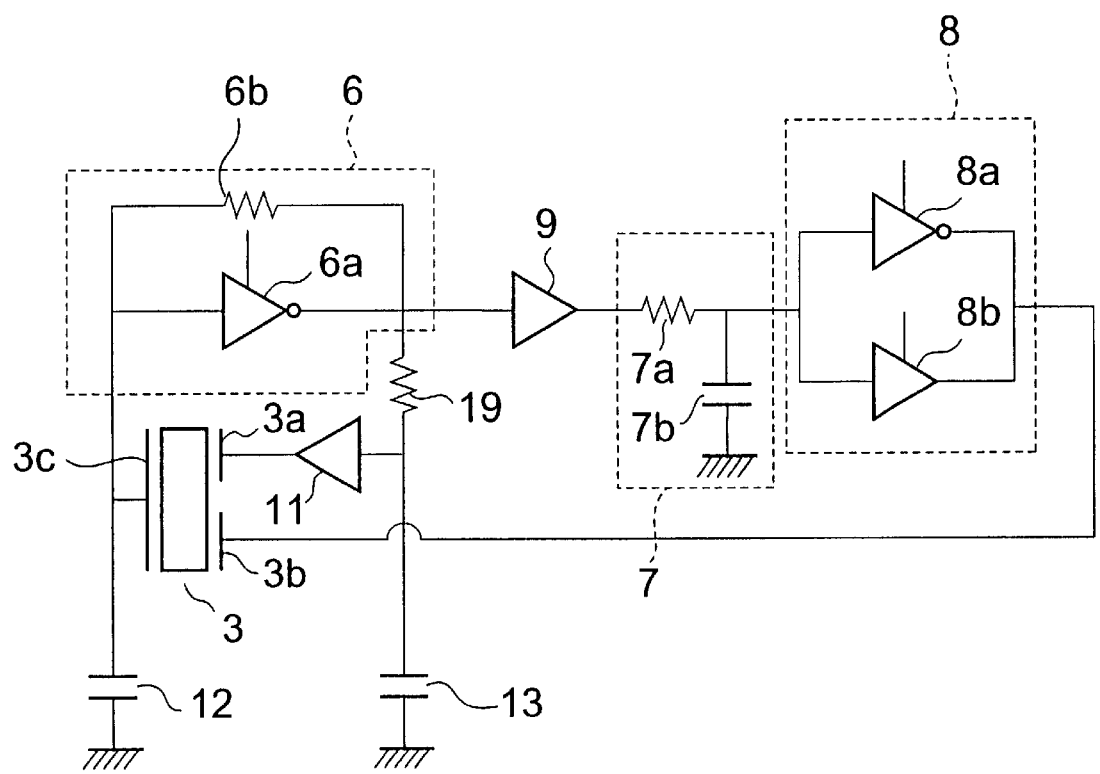
FIG. 4 is a circuit diagram of the ultrasonic motor according to Embodiment 1 of the invention.
Figure 9:
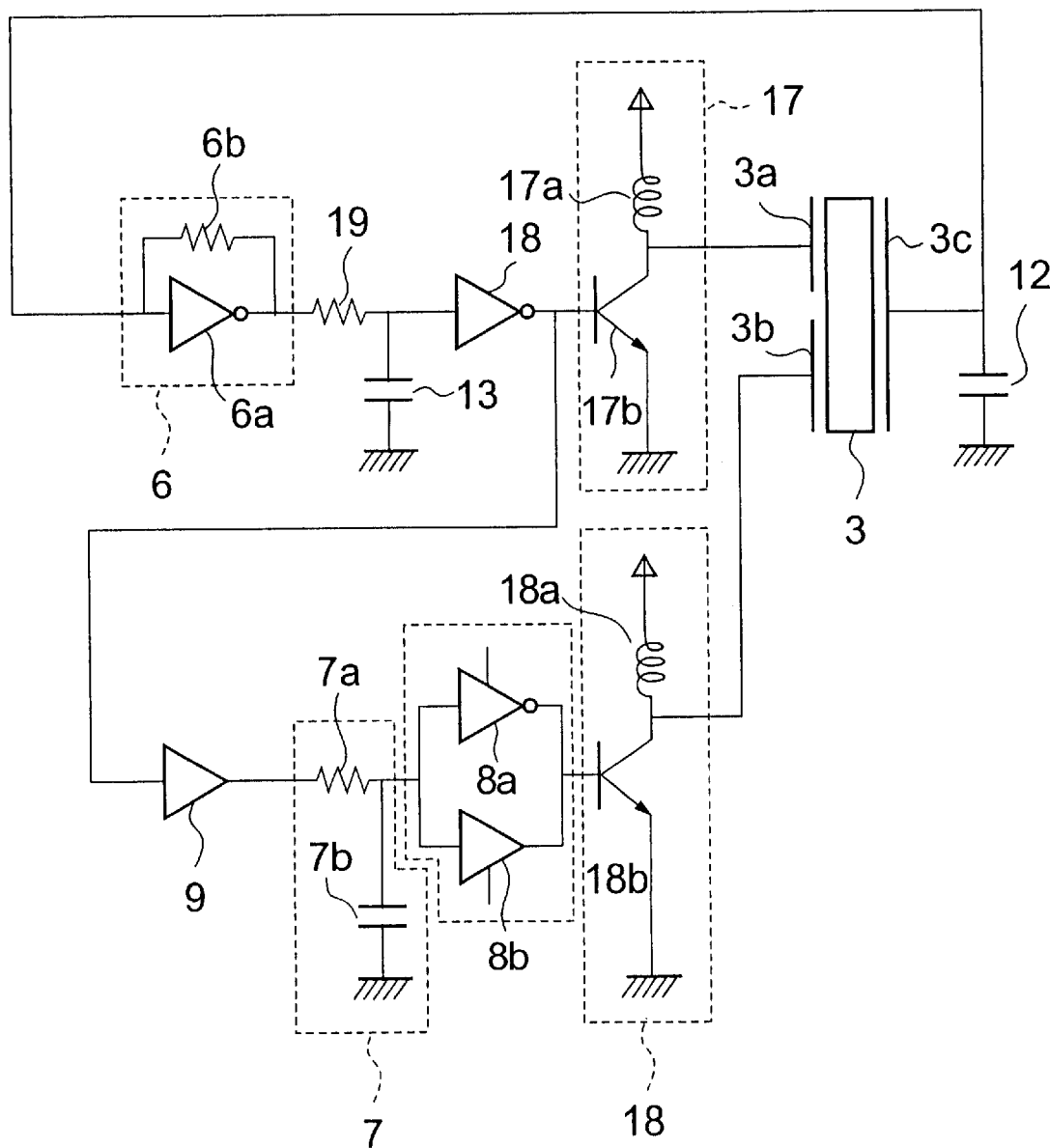
FIG. 9 is another example of a circuit diagram of an ultrasonic motor according to Embodiment 1 of the invention.

Meanwhile, the circuit of FIG. 4 may be modified to provide a booster circuit in the circuit as shown in FIG. 9. In this case, booster circuits 17, 18 are provided in the forward of the two electrodes 3a and 3b. This provides an ultrasonic motor that is low in voltage but high in output.

Also, the booster circuits are applicable to all the drive circuit as shown in the embodiments given below.

Although similar to the below embodiments, it is satisfactory that the parts shown in the present embodiment are omitted if the function/structure is identical. For the amplifier circuit for example, the configuration may be with an operation amplifier, transistor, etc.

Embodiment 2

Figure 5:
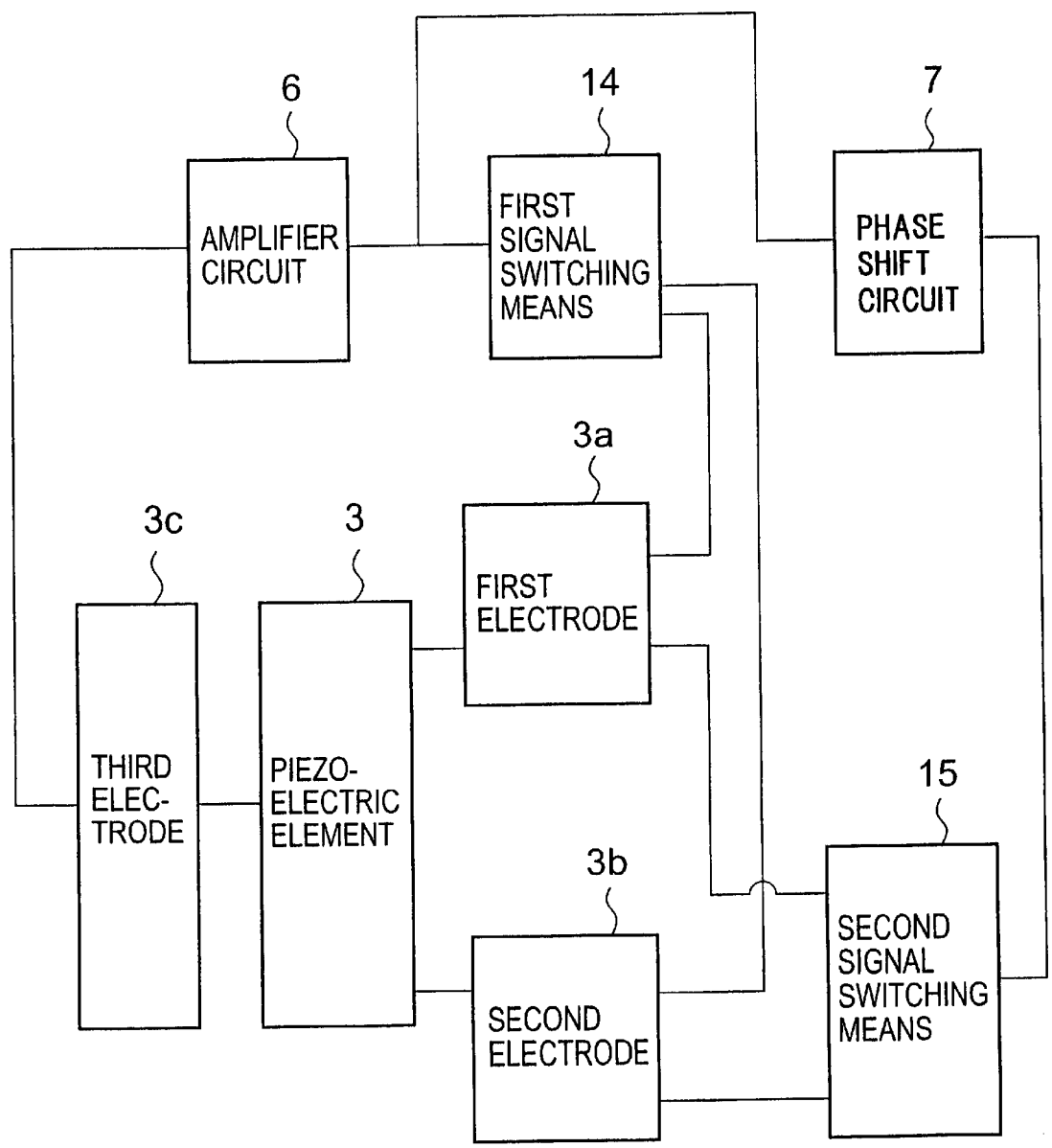
FIG. 5 is a block diagram of an ultrasonic motor according to Embodiment 2 of the invention.

FIG. 5 is a block diagram showing a configuration of an ultrasonic motor and ultrasonic-motor drive circuit according to Embodiment 2 of the invention.

The output signal from the third electrode 3c provided on the piezoelectric element 3 is amplified in the amplifier circuit 6 and then passed through the first signal switching means 14. Determination is made whether the output thereof is to be fed back to the first electrode 3a or to the second electrode 3b. This constitutes a self-excited oscillation circuit 10 oscillating at an eigenfrequency of the piezoelectric element 3. Although the vibrating body 2 is not described herein, it is satisfactory that only the piezoelectric element 3 serves as a vibrating body 2 to provide a drive force to the moving body 5. Otherwise, the vibrating member 2 may be bonded on the piezoelectric element 3 as in FIG. 2. In such a case, oscillation occurs at an eigenfrequency of the vibrating body 2 including the piezoelectric element 3.

The oscillation signal of the self-excited oscillation circuit 10 is deviated in phase (e.g. by 90 degrees) in the phase-shift circuit 7. This signal is passed through the second signal switching means 15 to determine whether to feed back an output thereof to the first electrode 3a or to the second electrode 3b. Accordingly, the piezoelectric element 3 is applied by two signals different in phase. Because of generation of two standing waves having different phases in time, displacement is given as elliptical motion.

In the meanwhile, the first signal switching means 14 selects an electrode to constitute a self-excited oscillation circuit 10. The second signal switching means 15 selects an electrode to output a signal shifted in phase relative to the signal of the self-excited oscillation circuit 10. By changing the combination of an electrode selected by the first signal switching means and an electrode selected by the second signal switching means, it is possible to change a direction of the elliptical motion of vibration displacement thereby changing a moving direction of the moving body 5.

Figure 6:
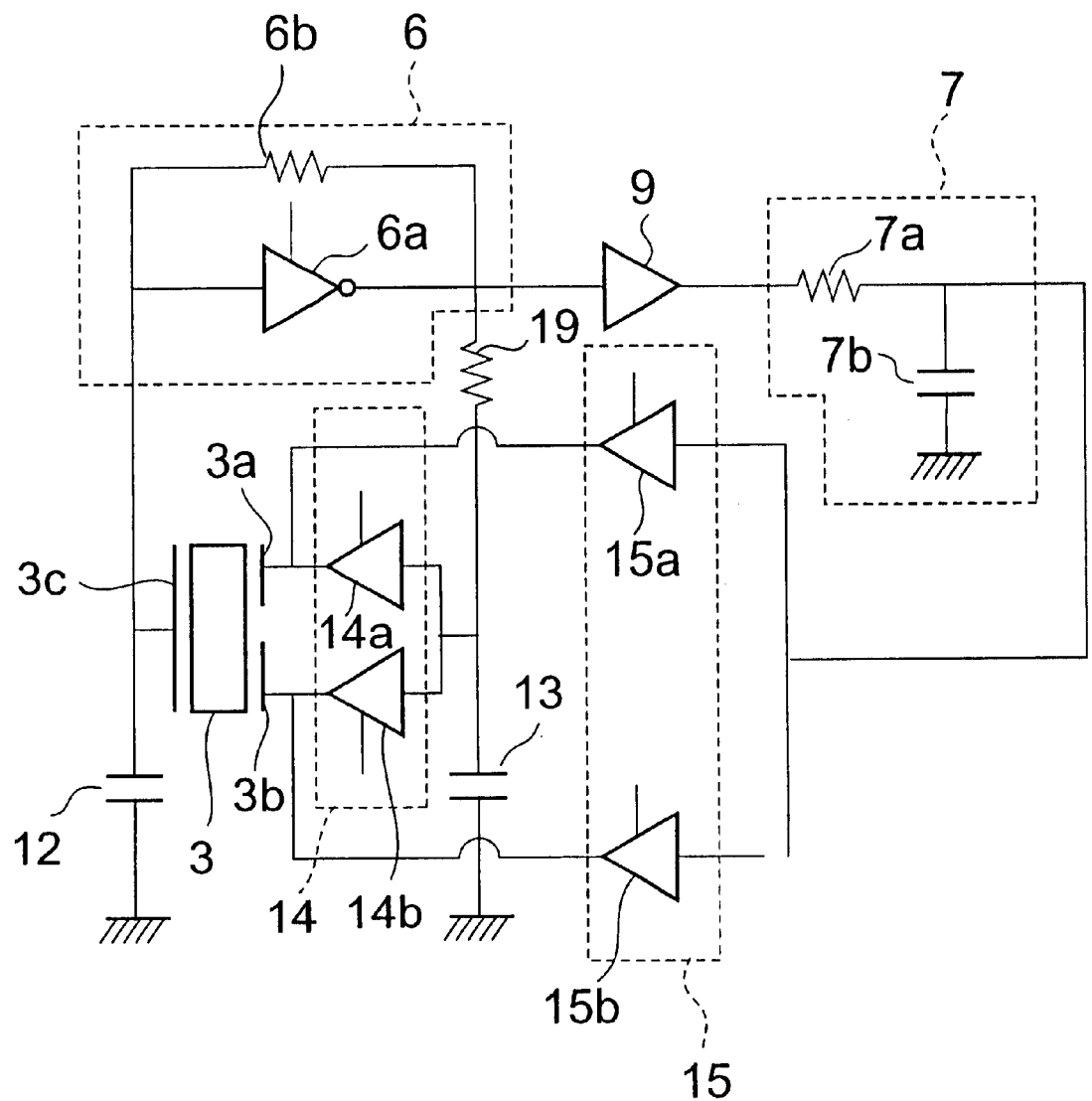
FIG. 6 is a circuit diagram of the ultrasonic motor according to Embodiment 2 of the invention.

Next, a detailed circuit configuration will be explained using FIG. 6. The output signal from the third electrode 3c provided on the piezoelectric element 3 is amplified in an amplifier circuit 6 configured by a three-state inverter 6a and a feedback resistance 6b and then fed back to the first electrode 3a or second electrode 3b through the first signal switching means 14 configured by two three-state buffers 14a, 14b. Herein, a self-excited oscillation circuit 10 is constituted by selecting an electrode connected to an enabled buffer of the two three-state buffers 14a, 14b, according to an external instruction signal. On this occasion, by a feedback circuit configured by any of the piezoelectric element 3 and resistance 19, capacitors 12, 13 and three-state buffers 14a, 14b, a signal having a frequency component at around the eigenfrequency of the oscillating body 2 including the piezoelectric element 3 is fed-back to the amplifier circuit 6. By maintaining oscillation, a self-excited oscillation circuit 10 is constituted. Part of the self-excited oscillation signal is taken out through the buffer 9 and sifted in phase by a predetermined amount in the phase-shift circuit 7. The example herein was shown of the phase-sift circuit 7 configured by a low-pass filter circuit having the resistance 7a and the capacitor 7b. However, these may be arranged in a plurality of stages in order to increase phase-shift amount. Otherwise, the phase-shift circuit 7 may be constituted with using another scheme of a circuit.

Thereafter, the output signal from the phase-shift circuit 7 is outputted to the first electrode 3a or the second electrode 3b through the second signal switching means 15, according to an external instruction signal. Herein, the self-excited oscillation signal is taken out through the buffer 9 that is high in input impedance but low in output impedance. Accordingly, stable oscillation is feasible without having effect upon the self-excited oscillation circuit. In this embodiment, the second signal switching means 15 is configured with two three-state buffers 15a, 15b. An electrode for outputting an output signal of the phase-shift circuit 7 is selected by making either one in an enable state, according to an external instruction signal. For example, if the phase-shift amount in the phase-shift circuit 7 is given 90 degrees, an electrode is selected of either the first electrode 3a or the second electrode 3b to thereby supply a signal delayed in phase by 90 degrees relative to the self-excited oscillation signal, according to an external instruction signal. This changes a direction of the elliptical motion of vibration caused on the vibrating body 2, thereby changing a moving direction of the moving body 5.

In the meanwhile, the phase-shift circuit 7 in some cases may be omitted. This is because, where utilizing for example an ultrasonic motor as described in Japanese Patent Laid-open No. 32491/1999, e.g. combined vibration of expansion and bending vibrations of a rectangular plate, the moving direction of the moving body 5 can be changed by making these two vibrations in the same phase or in the opposite phase. In this case, driving may be made by a scheme configuring the buffer 9 by for example an inverter to thereby applying a signal inverted by the inverter to any of the first electrode 3a and the second electrode 3b through the second signal switching means 15. Meanwhile, the second signal switching means 15 may be of a scheme serving also as signal inverting means.

For example, the three-state buffers 15a, 15b may be respectively configured with three-state inverters. Herein, the first signal switching means 14 and the second signal switching means 15 particularly are configured with the three-state buffers 14a, 14b and the three-state buffers 15a, 15b equivalent in electric characteristics (amplification degree, internal impedance, delay time, etc.). Accordingly, two standing waves caused on the vibrating body 2 are made equivalent in amplitude. Further, the ultrasonic motor 1 is given a constant characteristic regardless of a moving direction of the moving body 5.

Embodiment 3

Figure 7:
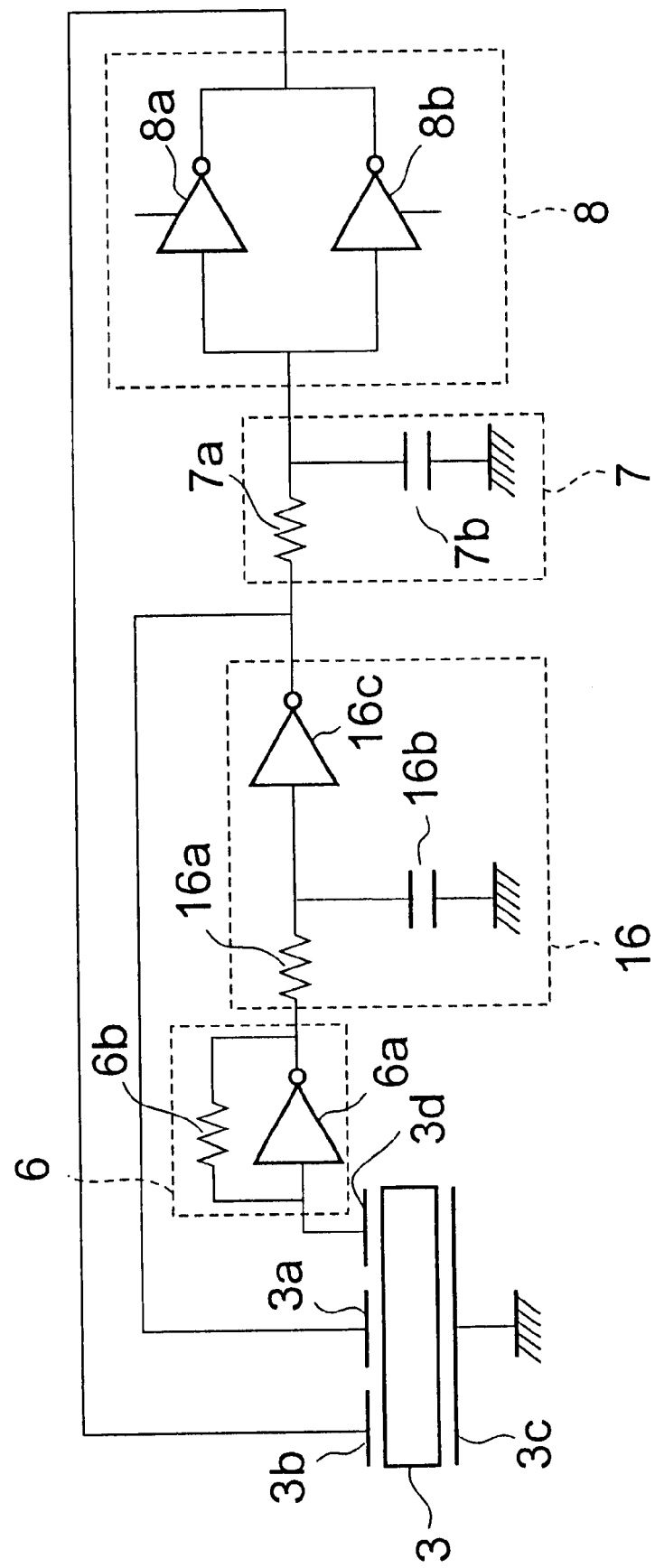
FIG. 7 is a circuit diagram of an ultrasonic motor according to Embodiment 3 of the invention.

FIG. 7 is a diagram showing a circuit configuration according to Embodiment 3. This is basically not different from that shown in Embodiment 1. However, the piezoelectric element 3 has a detecting electrode 3d separately from the driving electrode to amplify an output signal from the detecting electrode in the amplifier circuit and then feed it back to the driving electrode, thereby constituting a self-excited oscillation circuit.

The piezoelectric element 3 has, on one surface, a driving electrode 3a for oscillating a first standing wave, a drive electrode 3b for oscillating a second standing wave, and a detecting electrode 3d for outputting a signal depending on the vibration of the piezoelectric element 3 and vibrating body 2. On the other surface, a common electrode 3c is provided in grounding. The output signal from the detecting electrode 3d is amplified in an amplifier circuit 6 configured by a three-state inverter 6a and a feedback resistance 6b, and then shifted in phase by a predetermined amount in an integration circuit 16 formed by a resistance 16a, a capacitor 16b and an inverter 16c, being fed back to the driving electrode 3a. Thus, a self-excited oscillation circuit is constituted. Herein, it is possible to omit the integration circuit 16 serving as a phase-shift circuit. However, the oscillation frequency can be adjusted by proper selection of values, e.g. of a resistance 16a and a capacitor 16b.

Meanwhile, a self-excited oscillation signal is taken out through a buffer 9 and then inputted to the phase-shift circuit 7. The output signal from the phase-shift circuit 7 is outputted to the driving electrode 3b through a phase-shift selection circuit 8 capable of selecting a phase-shift amount, according to an external instruction signal. Herein, the self-excited oscillation signal is taken out through the buffer 9 that is high in input impedance but low in output impedance. Accordingly, stable oscillation is feasible without having an effect upon the self-excited oscillation circuit. In this embodiment, the phase-shift selection circuit 8 is determined which one of the three-state inverter 8a and the three-state buffer 8b is made in an enable state, according to an external instruction signal. This determines whether to output as it is the output signal from the phase-shift circuit 7 without shift in phase or to invert it by 180 degrees. For example, if the phase-shift amount in the phase-shift circuit 7 is given 90 degrees, the second electrode 3b is supplied with a signal advanced in phase by 90 degrees relative to an electric signal supplied to the first electrode 3a or with a signal delayed by 90 degrees, according to an external instruction signal. Consequently, the vibration caused on the vibrating member 2 is changed in moving direction of the elliptic motion of vibration, thereby changing a moving direction of the moving body 5.

Herein, in the forward of the first electrode 3a and second electrode 3b, an inverter 16c, a three-state inverter 8a and a three-state buffer 8b are particularly provided equivalent in electric characteristics (amplitude degree, internal impedance, delay time, etc.). Accordingly, two standing wave caused on the vibrating body 2 are given equivalent in amplitude. Further, the ultrasonic motor 1 is given a constant characteristic regardless of the moving direction of the moving body 5.

Embodiment 4

Figure 8:
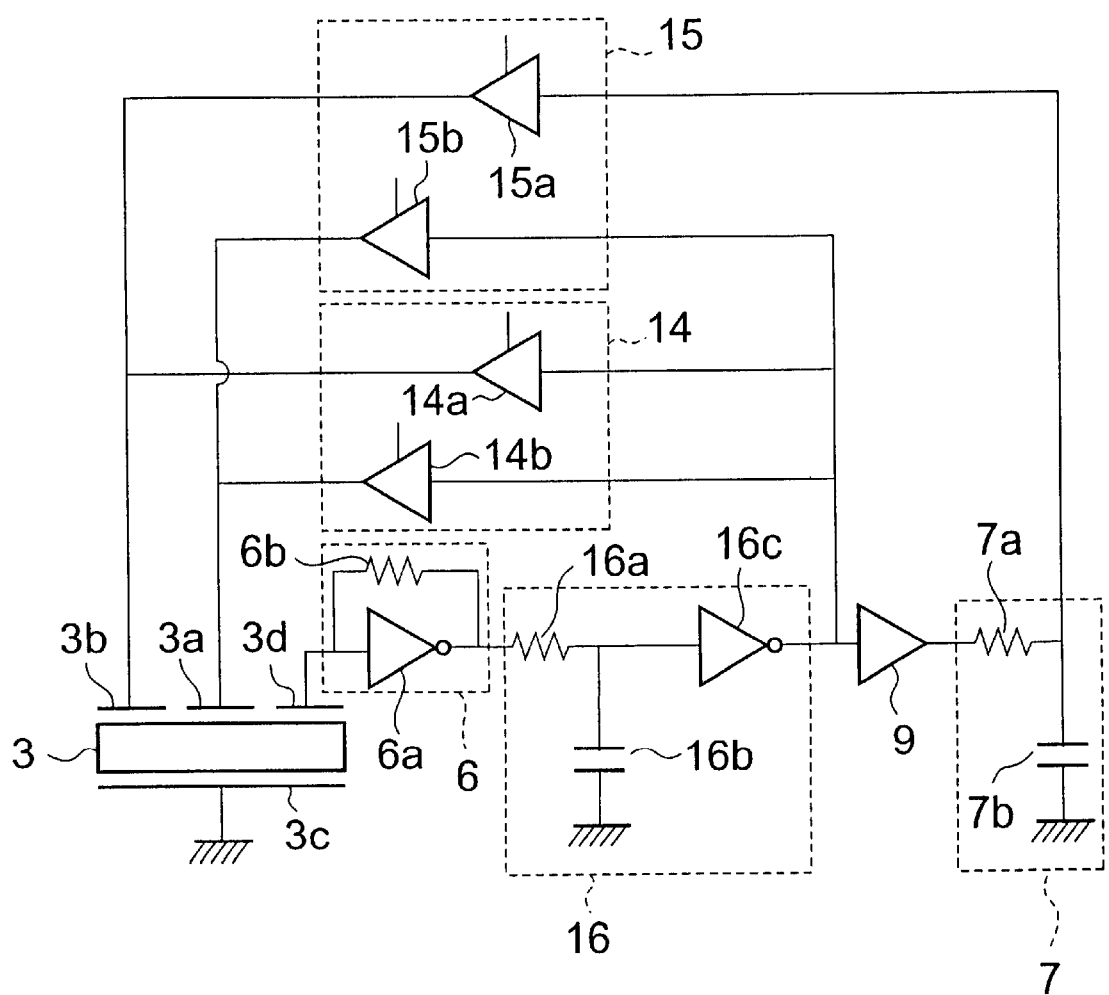
FIG. 8 is a circuit diagram of an ultrasonic motor according to Embodiment 4 of the invention.

FIG. 8 is a diagram showing a circuit configuration according to Embodiment 4. This is basically not different from that shown in Embodiment 2. However, a detecting electrode 3d is provided separately from the driving electrode on the piezoelectric element 3. The output signal from the detecting electrode is amplified in the amplifier circuit and then fed back to the driving electrode, thereby constituting a self-excited oscillation circuit.

The piezoelectric element 3 has, on one surface, a driving electrode 3a for oscillating a first standing wave, a driving electrode 3b for oscillating a second standing wave, and a detecting electrode 3d for outputting a signal depending on vibration on the piezoelectric element 3 and vibrating body 2. On the other surface, a common electrode 3c is provided in grounding.

The output signal from the detecting electrode 3d is amplified in an amplifier circuit 6 formed by a three-state inverter 6a and a feedback resistance 6b and then shifted in phase by a predetermined amount in an integration circuit formed by a resistance 16a, a capacitor 16b and an inverter 16c, followed by being fed back to the driving electrode 3a through first signal switching means 14 formed by two three-state buffers 14a, 14b. Thus, a self-excited oscillation circuit is constituted. Herein, a drive signal is applied to an electrode connected to an enabled buffer of the two three-state buffers 14a, 14b, according to an external instruction signal. Thus, a self-excited oscillation circuit 10 is constituted. The integration circuit 16 serving as a phase-shift circuit may be omitted. However, the oscillation frequency can be adjusted by the proper selection of values, for example, of the resistance 16a and capacitor 16b.

Meanwhile, the self-excited oscillation signal is taken out through the buffer 9 and then passed through the phase-shift circuit 7. The output signal from the phase-shift circuit 7 is outputted to the driving electrode 3a or 3b through second signal switching means 15. The second signal switching means 15 are configured with two three-state buffers 15a, 15b, to select which one is to be made in an enabled state, according to an external instruction signal. Due to this, selected is an electrode to output an output signal of the phase-shift circuit 7. For example, if the phase-shift circuit 7 is given a phase-shift amount of 90 degrees, selected is an electrode to be supplied by a signal having a phase delayed by 90 degrees relative to the self-excited oscillation signal, according to an external instruction signal. This accordingly changes a direction of the elliptical motion of vibration caused on the vibrating body 2, thereby changing a moving direction of the moving body 5. Herein, the self-excited oscillation signal is taken out through the buffer 9 that is high in input impedance but low in-output impedance. Accordingly, stable oscillation is feasible without having an effect upon the self-excited oscillation circuit.

In particular, the first signal switching means 14 and the second signal switching means 15 are configured with the three-state buffers 14a, 14b and three-state buffers 15a, 15b equivalent in electric characteristics (amplification degree, internal impedance, delay time, etc.). Accordingly, the two standing wave caused on the vibrating body 2 are made equivalent in amplitude. Further, the ultrasonic motor 1 is given a constant characteristic regardless of a moving direction of the moving body 5.

Embodiment 5

Figure 10:
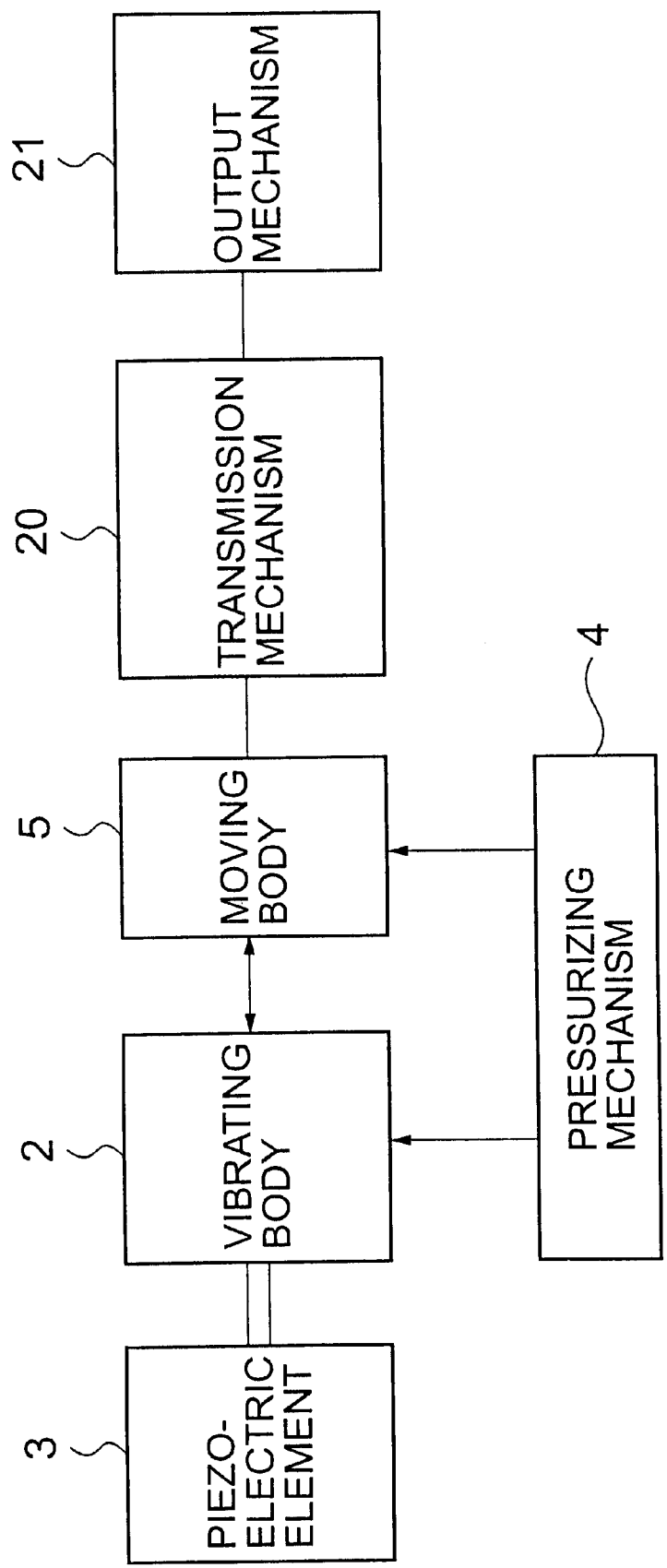
FIG. 10 is a block diagram of an electronic apparatus having an ultrasonic motor according to Embodiment 5 of the invention.

FIG. 10 shows a block diagram of Embodiment 5 that the ultrasonic motor is applied to an electronic appliance.

This electronic appliance is characterized by a vibrating body 2 as mentioned above, a moving body 5 to be driven by the vibrating body 2, a moving body 5, pressurizing means 4 for providing a contact pressure to the moving body 2, a transmission mechanism 20 moving interactively with the moving body 5, and an output mechanism 21 moving on the basis of the operation of the transmission mechanism 20.

Herein, the transmission mechanism 20 uses, for example, a transmission wheel, such as a gear or friction wheel. The transmission mechanism 20 may be omitted to directly provide the output mechanism 21. The output mechanism 21 uses, for example, a hand, a hand drive mechanism, an indicator plate such as a calendar or indicator-plate drive mechanism, for indicator device or electronic timepiece; a mirror for changing a direction of a laser, for a copier or printer; a shutter drive mechanism, a diaphragm drive mechanism, a lens drive mechanism, a film winding mechanism or the like, for a camera or video camera; a slit plate or filter for cutting off or transmitting light or particular wavelength portion of light, for a measuring instrument or manufacturing equipment utilizing laser or light; a contact mechanism or gap plate for varying a resistance or capacitance value, for an audio-appliance volume control; or a pickup drive mechanism, for a hard disk or optical disk.

Meanwhile, if an output shaft is provided to the moving body 5 to structure a power delivery mechanism for delivering torque through the output shaft, a drive mechanism can be realized by the ultrasonic motor itself.

As explained above, the driving circuit can be size-reduced and simplified by using the self-excited oscillation circuit of the ultrasonic motor of the present invention. Moreover, because the ultrasonic motor can be driven on the two phase-different signals, the ultrasonic motor can be increased in output and efficiency and the moving body can be reduced in wear thereby making possible to increase the life of the ultrasonic motor. By mounting the ultrasonic motor on an electronic apparatus, the performances can be improved including size-reduction, thickness reduction, power saving and the like of the electronic apparatus.

What is claimed is:

1. An ultrasonic motor having a moving body to be driven by vibration of a vibrating body having a piezoelectric element, the ultrasonic motor comprising:

the piezoelectric element having first, second and third electrodes;

an output signal from the third electrode being amplified by an amplifier circuit and fed back to the first electrode thereby constituting a self-excited oscillation circuit;

phase selection means provided to select whether to invert or not invert a signal based on an oscillation signal of the self-excited oscillation circuit according to an external instruction signal; and an output signal of the phase selection means being applied to the second electrode to obtain a drive force.

2. An ultrasonic motor having a moving body to be driven by vibration of a vibrating body having a piezoelectric element, the ultrasonic motor comprising:

the piezoelectric element having first, second and third electrodes;

an amplifier circuit for amplifying an output signal from the third electrode;

first signal switching means provided to select whether to output an output signal of the amplifier circuit to the first electrode or to the second electrode, according to an external instruction signal; and a self-excited oscillation circuit formed by the third electrode, the amplifier circuit and an electrode selected by the first signal switching means; and second signal switching means provided to select whether to output a signal based on an oscillation signal of the self-excited oscillation circuit to the first electrode or the second electrode, according to an external instruction signal.

3. An ultrasonic motor according to claim 1 or 2, wherein a signal based on an oscillation signal of the-self-excited oscillation circuit is a signal different in phase from the oscillation signal.

4. An ultrasonic motor according to claim 2, wherein the second switching means inverts a phase of the oscillation signal.

5. An ultrasonic motor according to claim 1 or 2, wherein the piezoelectric element has a fourth electrode being grounded.

6. An ultrasonic motor according to claim 1 or 2, wherein booster circuits are provided respectively between the amplifier circuit and the first electrode and between the phase selection means and the second electrode.

7. An ultrasonic motor according to any of claims 1 to 4, wherein the phase selection means, the first signal switching means and the second signal switching means are configured by an amplifier circuit.

8. An electronic apparatus having an ultrasonic motor having an ultrasonic motor as recited in claim 1 and having a transmission mechanism operation in unison with the moving body and an output mechanism operating on the basis of operation of the transmission mechanism.

9. An electronic apparatus having an ultrasonic motor having an ultrasonic motor as recited in claim 2 and having a transmission mechanism operation in unison with the moving body and an output mechanism operating on the basis of operation of the transmission mechanism.

10. An electronic apparatus having an ultrasonic motor having an ultrasonic motor as recited in claim 3 and having a transmission mechanism operation in unison with the moving body and an output mechanism operating on the basis of operation of the transmission mechanism.

11. An electronic apparatus having an ultrasonic motor having an ultrasonic motor as recited in claim 4 and having a transmission mechanism operation in unison with the moving body and an output mechanism operating on the basis of operation of the transmission mechanism.

12. An electronic apparatus having an ultrasonic motor having an ultrasonic motor as recited in claim 5 and having a transmission mechanism operation in unison with the moving body and an output mechanism operating on the basis of operation of the transmission mechanism.

* * * * *